United States Patent [19]

Pash et al.

[11] Patent Number: 4,753,597
[45] Date of Patent: Jun. 28, 1988

[54] MULTIPLE SEGMENT NONSEQUENTIAL RECORDING

[75] Inventors: James E. Pash, Vista; James V. Patton; Denise A. Patton, both of Spring Valley; Don R. Murray, Vista, all of Calif.

[73] Assignee: Tummies Limited Partnership, San Clemente, Calif.

[21] Appl. No.: 873,187

[22] Filed: Jun. 11, 1986

Related U.S. Application Data

[63] Continuation-in-part of Ser. No. 670,395, Nov. 8, 1984, Pat. No. 4,606,726.

[51] Int. Cl.$^4$ .............................................. G09B 7/00
[52] U.S. Cl. .................................... 434/321; 434/318; 434/322; 369/277; 446/487
[58] Field of Search ............... 434/321, 318, 319, 308, 434/322, 335; 446/147, 487, 488, 302

[56] References Cited

U.S. PATENT DOCUMENTS

| | | | |
|---|---|---|---|
| 802,135 | 10/1885 | Bryant | 369/277 |
| 870,961 | 11/1907 | Hoffman . | |
| 936,976 | 10/1909 | Berliner . | |
| 1,222,381 | 4/1917 | Frankel . | |
| 1,331,857 | 2/1920 | Walthers . | |
| 1,792,159 | 2/1931 | Gonzalez . | |
| 1,867,997 | 7/1932 | Baruch . | |
| 2,033,648 | 3/1933 | Ranger . | |
| 2,511,708 | 6/1950 | Hammond | 369/283 |
| 2,524,143 | 10/1950 | Smith | 434/318 X |
| 2,531,510 | 11/1950 | Heacock | 273/285 X |
| 2,703,241 | 3/1955 | Abramson | 369/277 |
| 3,079,160 | 2/1963 | Winchell | 369/277 |
| 3,086,297 | 4/1963 | Kantrowitz | 434/318 X |
| 3,408,749 | 11/1968 | Brudner | 434/324 X |
| 3,426,960 | 2/1969 | Shore . | |
| 3,611,587 | 10/1971 | Roberts | 434/324 X |
| 3,623,157 | 11/1971 | Stapleford | 434/335 X |
| 3,829,610 | 8/1974 | Meeussen et al. . | |
| 3,947,972 | 4/1976 | Freeman | 434/321 |
| 3,987,484 | 10/1976 | Bosche et al. | 434/307 X |
| 4,170,832 | 10/1979 | Zimmerman | 434/323 |
| 4,572,513 | 2/1986 | Evans | 434/308 X |
| 4,606,726 | 8/1986 | Pash et al. | 434/321 |

OTHER PUBLICATIONS

R. A. Montgomery, The Haunted House, Bantam Books, Inc., first printing date of Nov., 1981.
Product Engineering, vol. 42, No. 2, 18th Jan. 1971, p. 36, Morgan Grampian, N.Y., U.S.; "Talking Machine Tells Workers How to Wire Complex Products".

Primary Examiner—William H. Grieb
Attorney, Agent, or Firm—Knobbe, Martens, Olson & Bear

[57] ABSTRACT

A recording has a plurality of segments, each of which is user selectable. The recording may be on any audio delivery medium including a phonograph record or a series of cassette tapes in which each segment is recorded on one band of the record or on one of the series of cassette tapes. Each recorded segment, such as the band on the phonograph record, may be identified by a visual indicium, such as color. The recorded information of at least some of the segments instructs the user to select another segment, with the other segment identified by its visual indicium so the user can select the chosen segment. Pieces may be provided for manipulation in accordance with the interactive recording. A play field may be provided having locations thereon coded with visual indicia corresponding to the visual indicia identifying the recorded segments to reinforce the choices available to the user and to supply feedback or contributing information to the user.

28 Claims, 5 Drawing Sheets

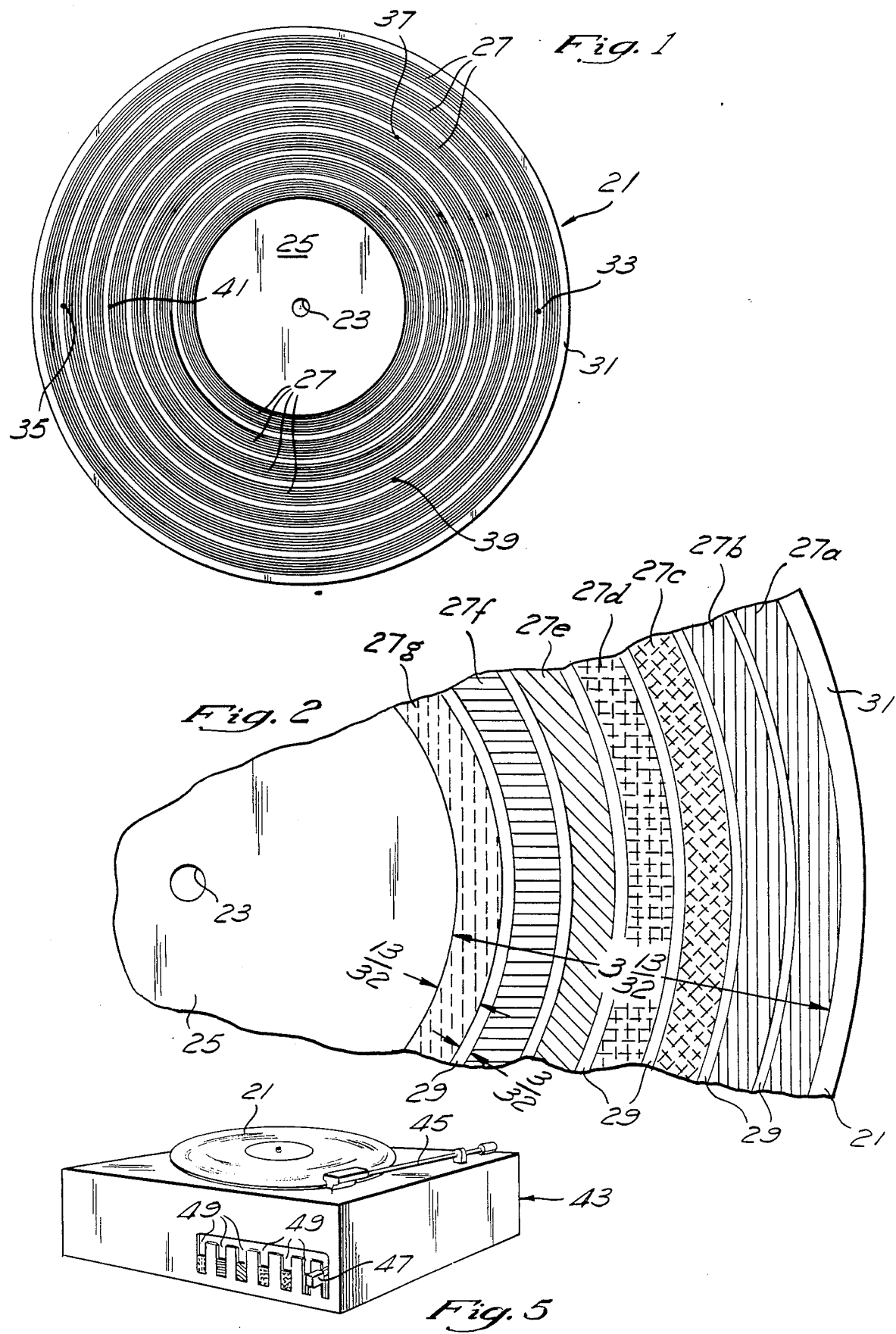

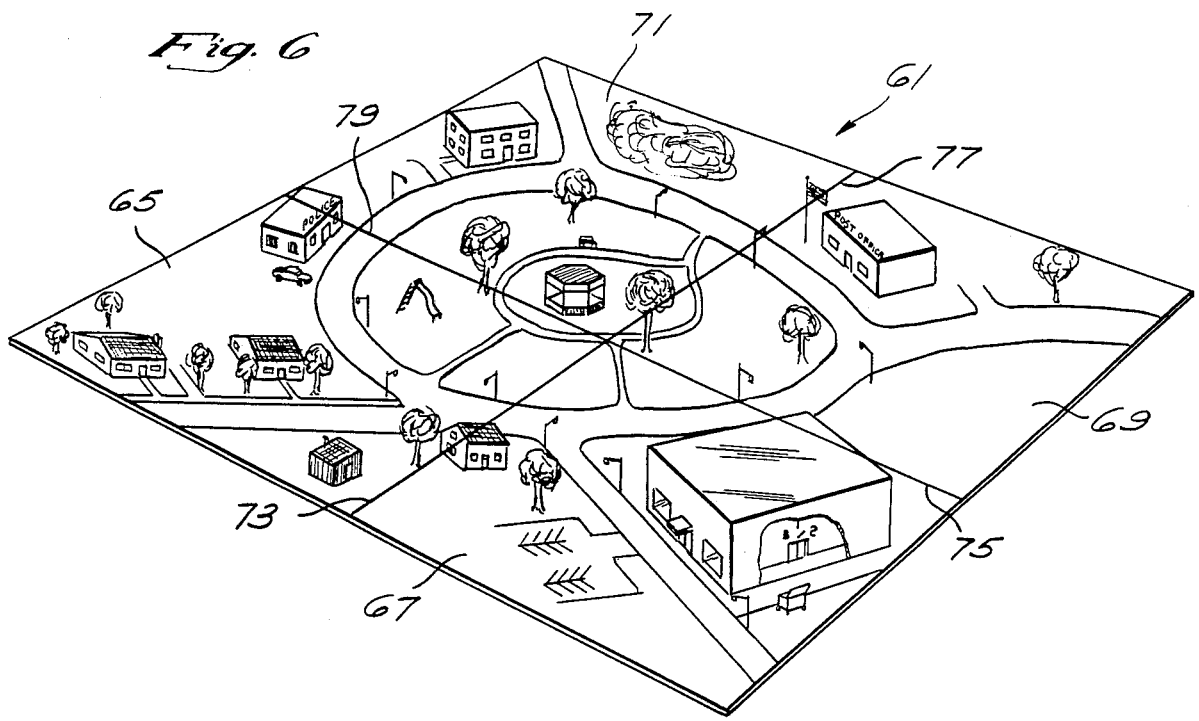
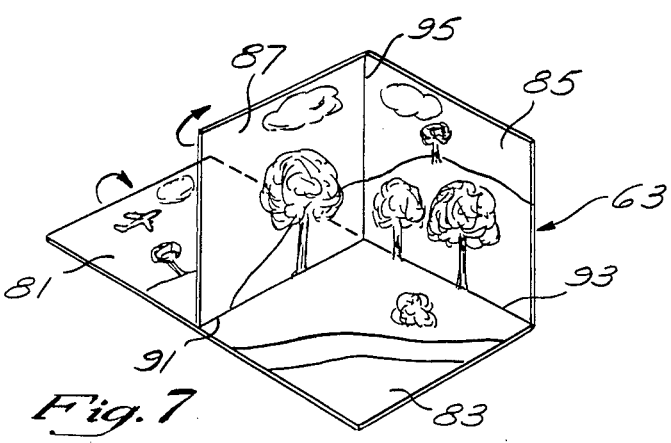
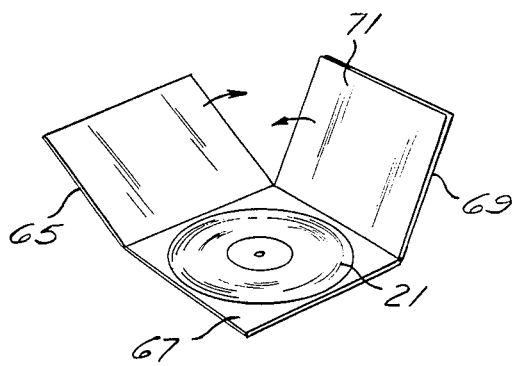
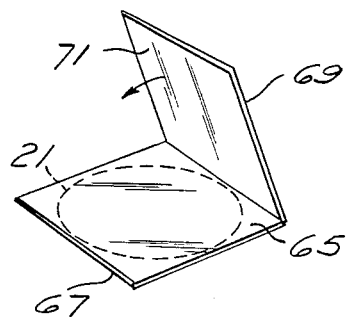

MULTIPLE SEGMENT NONSEQUENTIAL RECORDING

CROSS REFERENCE TO RELATED APPLICATIONS

This application is a continuation-in-part of U.S. application Ser. No. 670,395, filed Nov. 8, 1984. U.S. Pat. No. 4,606,726, issued Aug. 19, 1986.

BACKGROUND OF THE INVENTION

The present invention relates to recordings for audio or visual information. The recording of the invention may be used to convey information in a user-interactive format. The invention also relates to recordings used in conjunction with play mats or other toys.

Audio and visual information is typically recorded and replayed sequentially. Since their inception, phonograph records have been designed and manufactured for sequential music and information delivery. Numerous examples are known in which a continuous spiral groove is cut in the surface of the disk record, generally beginning near the perimeter of the disk, and spiraling inward, to a point relatively near the center of the disk. At that point, the spiral groove becomes a circular groove, called a lock groove. When a stylus is placed near the perimeter of the record, the stylus follows the spiral groove of the record, until it reaches this lock groove. In the lock groove, the stylus follows the circle around the record indefinitely, until the stylus is physically lifted from the groove.

In many of the records marketed today, a standard twelve inch diameter record disk is designed to be played at 33⅓ revolutions per minute and may include a number of musical selections or other segments of information, which selections are designed to be played in sequence. The record includes a single groove having modulated (recorded) lengths corresponding to the musical selections. A length of unmodulated or silent groove separates adjacent selections, so that the stylus, as it follows the groove, plays the recorded segment, then has a period of silence, then plays the following band. The phonograph record then has a plurality of concentric bands or rings, each corresponding to one of the selections. A narrower ring of dead, or silent, space separates adjacent bands.

Another method of recording multiple segments on one side of a phonograph record is described in U.S. Pat. No. 2,703,241, issued Mar. 1, 1955 to H. C. Abramson. This patent describes a phonograph record in which several spiral grooves are recorded parallel each other, each beginning near the perimeter of the record, and spiraling parallel to each other in toward the center of the record, until they reach a common circular lock groove.

The record of the Abramson reference is used to record a story having several segments. Each side of each record has several interchangeable segments of the story, each recorded in one of the parallel spiral grooves. The sides of the records are played consecutively, with each side being played once. Which of the parallel spiral grooves is played on each side depends upon where the stylus is placed around the perimeter of the record, and is generally a random function. This configuration for the record requires that each recorded segment on each side of each record begin and end so as to coordinate with all of the segments of the preceding and following sides. The beginning of each must fit with all the endings from the previous side, and the ending of each must fit with all the beginnings on the following side. This limitation substantially restricts the story lines that may be recorded.

A phonograph record having sequential recorded information segments pressed on the record in a nonsequential arrangement is known. The record has segment 1 of the recording on the first (outer) portion of side 1 of the record. The recording at the end of segment 1 instructs the listener to turn the record over and listen to side 2, and a lock groove is provided at the end of this first segment on side 1. At the end of the second segment, recorded on the entire side 2, the insructions tell the listener to again flip the record and listen to segment 3 on the inner portion of side 1. The recorded material is thus played sequentially. This arrangement is made to provide approximately 20 uninterrupted minutes of recording for segment 2.

Some systems, such as that described in U.S. Pat. No. 4,170,832, issued Oct. 16, 1979, to Kurt Zimmerman, include a method of interactively conveying information recorded on video tape. Similar systems are known that use audio tape. These systems use different tracks on the magnetic video or audio tape for different segments of recorded information. The tracks are selected by the playback machine in response to user selection through a keyboard. The machines used to replay the tapes are expensive because of the complicated mechanisms necessary to select and play back the appropriate track of the tape.

Laser disks also are used to store and replay video or audio information. The selection of segments on the disk is by microcomputer control incorporating a dedicated program that acts in response to user input through a "joystick" or a keyboard. Playback machines incorporating this technology are also complicated and expensive.

A need exists for a nonsequential or interactive recording that uses limited technology, is inexpensive, simple to use, and uses inexpensive, uncomplicated playback equipment.

SUMMARY OF THE INVENTION

The invention is a user interactive recording, which comprises a recording medium having a plurality of user selectable recorded segments thereon. Each recorded segment is identified by a visual indicium, such as a color, or a band number. The recording, in at least one of the segments, instructs the user listener to select another segment, with the other segment identified by its visual indicium.

The preferred recording medium is a phonograph record having plural concentric rings, each containing a recorded segment of information. Each ring is ideally identified by a color to provide a visual indicium that may be readily recognized as the phonograph record is spinning on the phonograph for the user to select the appropriate band. In another aspect of the invention the recording medium is a series of audio or video cassette tapes or cartridges each having one or more recorded segments thereon and each being identified by a different visual indicium.

The recording of the inention is ideally suited for branched stories or for decisional instruction, in which a choice is presented at the end of several of the segments for the user to select among two or more options.

The recording then presents consequences of that choice or follows different lines of story development.

The recording of the invention is particularly useful in combination with a play mat providing a two-dimensional or three-dimensional area displaying pictures or information coordinated with the information on the recording. In another aspect of the invention locations on the play mat that are referred to in the recorded segments are marked with the indicia corresponding to the indicia identifying the respective recorded segments. In another aspect of the invention, two or three dimensional toys or trackers can be provided for interactive play or activity. In a further aspect of the invention the toys or trackers are marked with indicia corresponding to the indicia identifying the recorded segment in which the subject matter represented by each toy or tracker is discussed.

The recording of the invention is useful in a wide variety of educational and entertainment applications using relatively simple and inexpensive technology.

BRIEF DESCRIPTION OF THE DRAWINGS

FIG. 1 is a view of the preferred embodiment of the recording of the invention.

FIG. 2 is an enlarged view of a portion of the phonograph record shown in FIG. 1.

FIG. 5 is a perspective view of a phonograph that may be used in conjunction with the preferred embodiment of the recording of the invention.

FIG. 6 shows a preferred embodiment of an interactive play field that can be used in conjunction with the recording of the invention.

FIG. 7 shows an interactive play field that can be used in conjunction with the recording of the invention to provide a three-dimensional setting, and having an interchangeable background scene panel.

FIGS. 8 and 9 show the play field of either FIG. 6 or FIG. 7 being folded over the phonograph record to form a jacket for the record.

DETAILED DESCRIPTION OF THE PREFERRED EMBODIMENTS

Figure 3A:
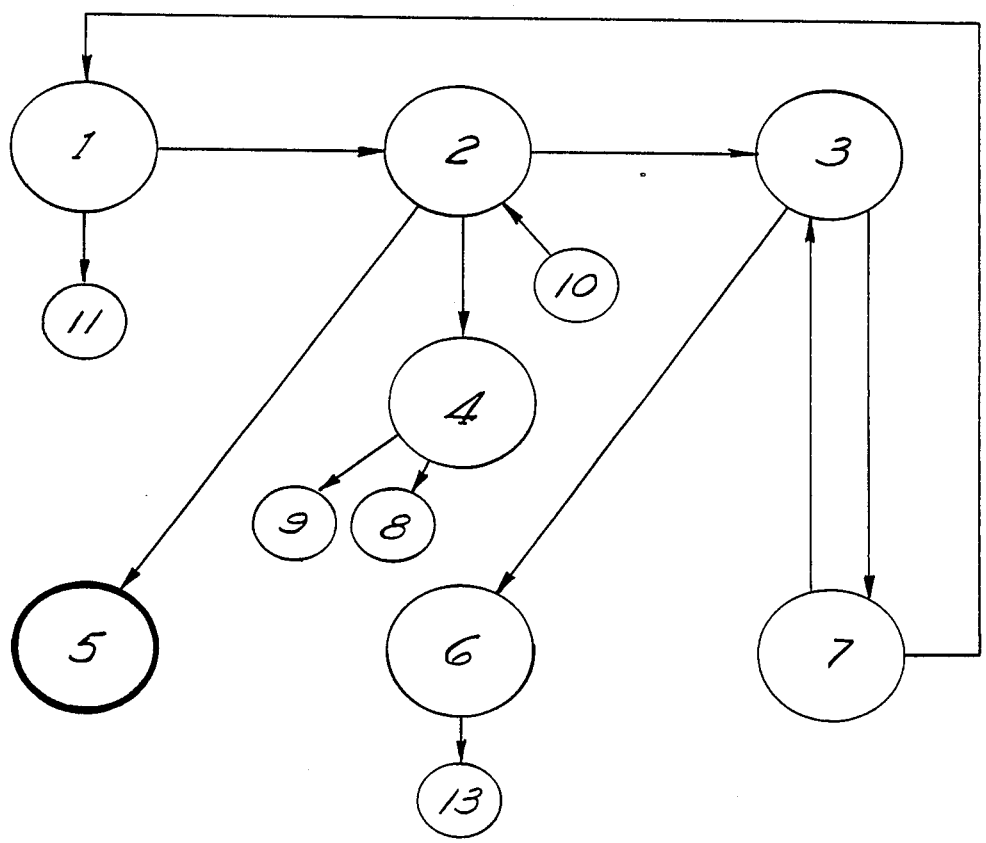
FIGS. 3a and 3b are a chart of the possible story paths for one version of a story recorded on the recording of the invention.

In the preferred embodiment of the recording shown in FIG. 1, the recording medium is a phonograph record 21 adapted to fit standard modern phonograph turntables. An opening 23 in the center of the record 21 receives the spindle of the phonograph turntable. An area 25 around the central opening 23 provides room for a label with printed information relating to the recording. A plurality of concentric bands 27, each including one or more modulated grooves containing recorded segments of information encircle the center of the record. The preferred embodiment shown has seven such bands 27.

The preferred phonograph record is approximately twelve inches in diameter. The record is preferably recorded to be replayed while revolving at 33⅓ RPM for play on standard phonographs.

Each band 27 on each side of the record 21 is identified by a visual indicium. In the preferred embodiment shown, colors are used as the visual indicia. Other indicia are possible, but color is preferred because it can be readily discerned as the record 21 is spinning on the phonograph turntable.

When color is used as the identifier with seven bands per side of the recording, the inventor has found the color pattern shown in FIG. 2 to be advantageous. Beginning with the outer band 27a as band #1, band #1 is pink; band #2, 27b, is red; band #3, 27c, is orange; and #4, 27d, is yellow; band #5, 27e, is green; band #6, 27f, is blue; and band #7, 27g, is purple.

For rings having the visual indicia to accurately identify the bands of recording, the color rings should align with the modulated groove of the corresponding band of modulated groove so the modulated groove begins at the outer edge of the colored ring. A blank space 29 is provided between each band, which may be white. The white, or "blank", color ring aligns with the silent space between the recorded bands 27.

With the bands 27 identified for the user, the recording can present nonsequential branching segments of information that allows the user to select among different bands. Near the end of one segment of recording, the user might be asked to choose from among a plurality of options. The instructions may designate a particular band, preferably as identified by its visual indicium, for each option offered. For example, the recorded information in the first band 27a, which, referring to the embodiment shown in FIG. 2, is identified by the color pink, may include instructions for the user to select among alternatives provided. The user might be given the choice of options A or B. The user is instructed that if he selects option A, he should move the stylus to the yellow band 27d, but that if he selects option B, he should move the stylus to the green band 27e.

The ability of the user to select among different segments of a recording by selecting visually identified bands on a phonograph record in response to instructions from the recorded information enables a wide variety of educational and entertainment purpose to be carried out using relatively simple and inexpensive technology.

Althrough the recording of the invention is useful for a variety of applications, including adult games and instruction, the preferred embodiment will be described here as applied to a recording of a children's story. User selection of recorded segments allows a children's story to be recorded so as to allow the child-listener to exercise control over the direction of the story. Such a story can be created and recorded using the concept of "branching."

In a branched story, at the end of some or all of the segments of the story, the user is presented with a choice to be made. The user selects different segments of the recorded story based on his or her choice. For example, a recording of seven segments in which two options are given at the end of each semgent can contain four different stories formed of those segments. Segment A may be the first segment, and offer the listener the option of choosing segment B or segment C to follow it. From segment B, the listener may be offered the choice of D and E, for two optional endings. If, at the end of segment A, the listener selects segment C instead of segment B, options F and G may be offered. Thus, the following sequences of segments are possible: ABD, ABE, ACF, ACG. The story is written so that regardless of the selections made from the choices offered, the story makes sense.

To illustrate how a branched story on the multiple segment recording words, a specific example will be discussed. The story is entitled "Artie's Birthday Adventure." This story includes fourteen segments, seven of which are recorded on each side of the phonograph record 21. Each segment is recorded on one of the bands or rings 27.

In the following example the segments are numbered according to the bands on which they are recorded, and the positions of those bands on the phonograph record. The segments are thus numbered consecutively from the outside of the first side of the record. Thus, segment #1 is recorded on the outer band 27a of the first side, segment #2 is recorded on the next band 27b, and segment #7 is recorded on the innermost band 27g on the first side. Segment #8 is recorded on the outer band of the second side of the record, and segment #14 is recorded on the innermost ring of the second side. In this example, the bands are identified by their colors and the side of the record on which they are recorded.

The following is a brief synopsis of the fourteen segments used to make up the story.

"ARTIE'S BIRTHDAY ADVENTURE"

Sally tells Artie she has sent him a birthday present but, since it hasn't arrived yet, Artie goes on a search for it and has many varied adventures.

SEGMENT #1. (Pink band 27a, side 1) If a play field or other physical layout is used in conjunction with the recorded story, the narrator gives instructions for setting that up. The story begins: Artie gets a call from Sally and finds out that his birthday present from her is lost in the mail. He walks to the Post Office to check for it and then can go either: (a) home to check his mail box [listener instructed to play the Yellow band on side 2] or, (b) to the store where the present was bought and see if it has been mailed [listener instructed to play the Red band on side 1].

SEGMENT #2. (Red band 27b, side 1) Artie arrives at the store and has to decide what to do: (a) check with the toy department on the first floor [listener instructed to play Orange band on side 1], (b) check customer service on the second floor [listener instructed to play the Green band on side 1], or (c) check the basement [listener instructed to play the Yellow band on side 1].

SEGMENT #3. (Orange band 27c, side 1) Artie, on the first floor of the store, must either (a) look around the toy department to see if he can figure out what Sally may have bought him [listener instructed to play the Purple band on side 1] or (b) go ask about his present at the gift wrap department [listener instructed to play the Blue band on side 1].

SEGMENT #4. (Yellow band 27d, side 1) Artie takes the elevator to the basement, where he is frightened and leaves by an outside door. There he sees two men jump out of a trash dumpster and run. One of them has a package and Artie must decide to either (a) follow the men [listener instructed to play the Red band on side 2] or, (b) look in the dumpster [listener instructed to play the Pink band on side 2].

SEGMENT #5. (Green band 27e, side 1) Artie goes to customer service and asks Clark the Clerk if he knows anything about his present. Artie's present was sent to the wrong address. Artie hurries to the wrong address to search for his present. He arrives to discover it is Richard's house and there is a surprise party for Artie. The end.

SEGMENT #6. (Blue band 27f, side 1) Artie goes to thee gift wrap department and, since nobody is there, he starts snooping around and falls into a large wooden crate that is loaded onto a delivery truck. At its destination the box is opened. Artie is discovered and Artie discovers that the crate contained a bike for him delivered to his house. He then goes to Sally's house to thank her. [Listener instructed to play the Blue band on side 2.]

SEGMENT #7. (Purple band 27g, side 1) Artie gets distracted looking at toys in the toy department and is there until closing time. [Listener instructed to choose either the Pink band on side 1, or the Orange band on side 1.]

SEGMENT #8. (Pink band, side 2) Artie climbs into the dumpster, only to be picked up by Stinky Stretch in the trash truck and taken to the dump. When the truck is emptied Stinky discovers Artie, he calls for Police Wagon Willie who comes and takes Artie home. [Listener instructed to play the Orange band on side 2.]

SEGMENT #9. (Red band, side 2) Artie follows the thieves. Suspicious Sid and Sidekick Sam, and they lead him to their hideout, where they capture him, tie him up, and leave him in the closet. A neighbor sees what is happening and calls the police, who rescues Artie. He is taken home and then goes to Sally's to tell her what happened. [Listener instructed to play the Blue band on side 2.]

SEGMENT #10. (Orange band, side 2) Police Wagon Willie takes Artie home, where he bathes and goes back to the store. [Listener instructed to play the Red band on side 1.]

SEGMENT #11. (Yellow band, side 2) Artie goes home to check his mailbox, which turns out to be empty. Now he either (a) follows the mailman's route to try and catch him and, hopefully his present [listener instructed to play the Green band, side 2], or (b) goes to see if Sally's mail has arrived yet [listener instructed to play the Blue band, side 2.]

SEGMENT #12. (Green band, side 2) Artie follows the mailman's route but can't catch up with him. Then he hears music and follows the sound to the park. [Listener instructed to play the Purple band, side 2.]

SEGMENT #13. (Blue band, side 2) Artie goes to Sally's just as she is sneaking out the back door but he finds a note telling him to go to the park. [Listener instructed to play the Purple band, side 2.]

SEGMENT #14. (Purple band, side 2) Everybody in town goes to the park and Artie arrives last. It is a surprise birthday party for Artie. He gets presents. The end.

Figure 3B:
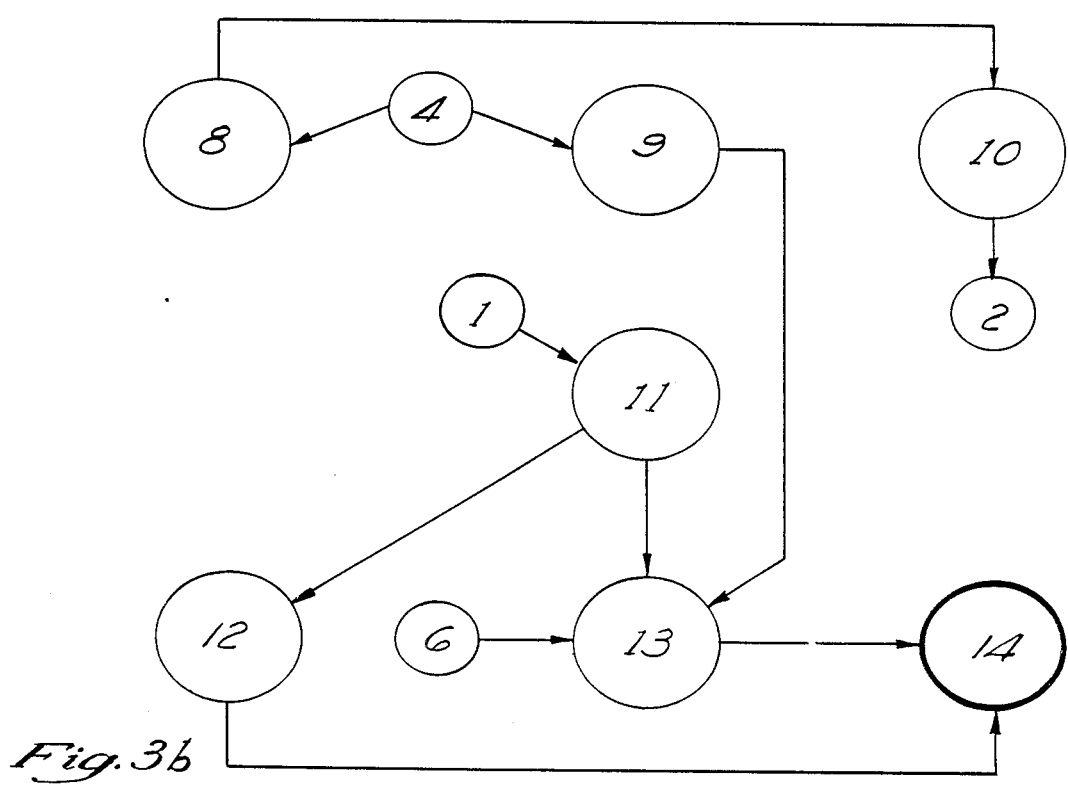

The chart of FIGS. 3a and 3b maps out the branches available for the story, based on the options given in each segment. Each large circle in the figure represents a colored band or recorded segment of side 1 or side 2 of the record. The Segments 1–7 are recorded on side 1, and shown in FIG. 3a. Segments 8–14 are recorded on side 2 and shown in FIG. 3b. The small circles indicate movement to or from the opposite side of the record. The lines with arrows indicate the possible directions of play resulting from the choices offered in the script. The heavily outlined circles represent the two end segments provided in the script for "Artie's Birthday Adventure." Thus, using this map, the various options and possible story paths can be traced.

Referring to FIG. 3a, the user listening to Segment #1 is given the option of selecting Segment #2 or segment #11 (on side 2 of the record). If he chooses Segment #2, he then is given the selection of any of Segments #3, #4, or #5. Segment #5 is an edging segment for the story. The inventor has found that there are forty-six story sequences possible from the fourteen segments outlined in the story synopsis of "Artie's Birthday Adventure" given above and shown in FIGS. 3a and 3b.

By properly composing the story segments and the choices provided, the story always makes sense, regardless of which combination of routes is taken, assuming the user selects only the choices offered in each segment.

Because of the various stories available by mixing the story segments, the inventor has found that a single twelve inch phonograph record can provide significantly greater entertainment value for children than a sequentially played recording. Through testing, the inventor has found that children continue to play with the recording until they have exhausted all of the choice options and all the branches in the story. Through such testing, the inventor has found that a recording of "Artie's Birthday Adventure," with fourteen segments, each approximately three minutes long, having a total of 42 minutes of recorded material, can give the listener/user who plays out all the choices providing approximately 117 minutes of entertainment. This expands the value of the single phonograph record to the equivalent of a three record set. If the child were to listen to all 46 possible complete story lines, the child can obtain even greater entertainment value from the invention.

For longer stories for other uses, the recording may include more than one record, with the instructions identifying a selection by a particular band on a identified record side in the set.

As identified by child development psychologists, answering questions and making choices are key stimuli for growth and child development. Thus, the nonsequential segmented recording of the invention, which requires the child listener to make choices between options, provides an important developmental tool for children that is inexpensive, easy to use, and provides for a large variety of applications.

As is shown by the example of "Artie's Birthday Adventure," it is not necessary that a choice be presented at the end of every segment. The listener may simply be instructed to play another band or ring. Nor need the choice be limited to two options. Virtually any number of selections may be presented.

Each side of the record 21 may include, in one preferred embodiment, just a single groove in the surface of the record disk, spiraling from near the perimeter of the record to a lock groove near the center. Ungrooved or "dead" space 31 at the very outer perimeter provides an area for the user to place the stylus to begin playing the record. A conventional lead-in groove catches the stylus to direct it into the modulated groove of the first band. The groove is modulated (contains recorded information) in each of the bands, and is not modulated in the rings 29 between the bands 27, giving a silent area for the user/listener to lift the stylus at the end of a segment, and to provide an area for the stylus to be placed at the beginning of a selected band. The groove of such a phonograph record would be similar to the groove of a modern conventional multiple segment sequential recording, such as a record containing a number of separate musical selections, each separated by silence.

In another preferred embodiment, the groove of each band 27 ends in a lock groove, so that when the stylus has moved through the band and played the information recorded on the spiral groove of that band, the stylus ceases moving radially inward, the simply follows the circular lock groove. A smooth surface or "dead area" 29 is provided between adjacent bands to space the bands apart and provide the user an area in which to set the stylus to play each inner band. The smooth ring 29 has no groove crossing it between the adjacent bands. Each inner band begins with a lead-in groove, which is essentially identical to the lead-in groove used at the beginning of a conventional phonograph record and at the beginning of the outer band 27a of the record of the preferred embodiment of the invention.

The size of the bands 27 may vary, depending on the information recorded thereon. For simplicity of manufacturing, it is preferred that each band be identical in width. For the recording having seven segments per side, as shown in FIG. 2, each band 27 is ideally 13/32 inch in width, with the dead space 29 between each band being 3/32 inch wide. This yields a total recorded area 3-13/32 wide from the outermost groove of the first band 27a to the lock groove of the innermost band 27g.

The bands are colored using available, known picture disk technology. A piece of material, such as a printed paper insert with the visual information, in this case the colored rings, is sandwiched between layers of clear vinyl so the material printed on the cardboard shows through the vinyl. The recording is pressed onto the vinyl using standard record pressing techniques. The master recording must be carefully prepared and the record carefully pressed to ensure that the recording and the visual information on the cardboard insert align. The recording for each band (modulated groove) should begin where the coloring of the band begins. The cardboard insert may have white strips between the colored bands that align with the dead space 29 or unmodulated groove area between adjacent bands. These strips should also be aligned as perfectly as practical.

A single modulated groove can be cut in the surface of two or more color bands 27 and across the space 29 between the color bands, so a single "segment" of recorded information covers two colored bands of the record, giving more time for that particular segment. This arrangement allows the recording of segments longer than the standard band segment length, while still allowing the convenience of manufacture and use that are associated with having a uniform band width on the record. The selections provided in the story or other material must be carefully written so as not to direct the listener/user to select bands that begin in the middle of an extended segment.

Visual indicia other than color, such as numbers, symbols, letters, or other designs may be used to identify the bands. Color is preferred because it is easy to distinguish as the record rotates on the turntable. The colors of the bands may be identically reproduced in the same sequence on both sides of the record, or they may be reversed to distinguish side 1 of the record from side 2. Of course, the order of the colors or the colors themselves may differ from that shown in FIG. 2.

The multiple segment recording of the invention can also be used for instructional information. For example, a question can be presented, and the listener asked to select an answer from among two or more choices. The listener is instructed to select a particular band 27 of the recording as identified by its visual indicium depending on the answer selected. The recording in the selected bands can give the appropriate response to the listener/student.

When the recording is used with other children or with adults, visual identification of the bands may not be necessary. The bands might be identified by their position on the record such as "the third band from the outside." Each band may have a number or letter assigned to it to facilitate identification, so band #1 might be the outer band, band #2 the adjacent band, and so forth.

Alternative Embodiment Incorporating Random Segment Selection

As an alternative to having a single spiral groove or track in each ring providing a single recorded segment in the band, it is possible to cut two or more nested, or parallel, spiral grooves in at least some of the bands 27, to provide multiple portions or alternative segments in the band. These multiple grooves can provide a certain amount of randomness to the segment selection process.

The parallel spiral grooves in a single band are referred to here as "coils." Each band is still identified by some visual indicium, such as a color, so the user can select the band based on that visual indicium. However, it is preferred that each separate coil or groove in the band not be individually visually identified.

When this randomization feature is desired, it is preferred that each band end in a lock groove adjacent its inner edge, so that the modulated grooves of each band are completely independent of the modulated grooves of the adjacent bands. Each groove of a band begins with a lead-in or access point that is equally spaced around the perimeter of the band from the other lead-ins. For example, a band having two coils preferably has two starting points 33, 35 spaced 180° apart. A band with three coils has starting points 37, 29, 41 spaced 120° apart. When the stylus is placed on the dead space between the bands, it slips into one of the lead-ins according to which access point the stylus is nearest as the record rotates. The choice of grooves is therefore not under the control of the user/listener, and is substantially random.

Below is a synopsis of the first three bands of the story "Artie's Birthday Adventure," in which the second and third bands each have three coils or parallel spiral grooves. The recorded segment portion of each coil within a band is identified by a decimal designation. The following synopsis illustrates the choices available to the listener and the random results possible when that band is played.

"ARTIE'S BIRTHDAY ADVENTURE"

Sally tells Artie she has sent him a birthday present but since it has not arrived yet he goes on a search for it and has many and varied adventures looking for it.

SEGMENT #1 (Side 1 Pink ring 27a - no coils). The narrator gives instructions for setting up the play field, if one is used. The story begins: Artie gets a call from Sally and finds out that his birthday present from her is lost in the mail. He walks to the Post Office to check for it, then he can either: (a) go home to check his mail box [listener instructed to play segment #11]or, (b) go to the store where the present was bought and see if it has been mailed [listener instructed to play segment #2].

SEGMENT #2.1 (side 1 Red ring 27b - coil #1.) Artie arrives at the store and must decide what to do: (a) check with the toy department on the first floor [listener instructed to play segment #3], (b) check customer service on the second floor [listener plays #5], or (c) check the basement [listener instructed to play segment #4].

SEGMENT #2.2 (Side 1 Red ring 27b - coil #2.) On his way to the store Artie finds a five dollar bill. Then another and another. Artie sees two men, one of whom is carrying a bag from which the money is falling. He decides to run and catch the men so he can give the money back. [Listener instructed to play segment #9.]

SEGMENT #2.3 (Side 1 Red ring 27b - coil #3.) Artie walks to the store. He takes a short cut through the alley behind the store. Two men come out the side door of the store, throw something into the trash dumpster and run past Artie into the street. Artie must either (a) follow the men [listener instructed to play segment #9] or (b) look in the dumpster [listener instructed to play segment #8].

SEGMENT #3.1 (Side 1 Orange ring 27c - coil #1.) Artie, on the first floor of the store, must either (a) look around the toy department to see if he can figure out what Sally may have bought him [listener instructed to play segment #7] or, (b) go ask about his present at the gift wrap department [listener instructed to play segment #6].

SEGMENT #3.2 (Side 1 Orange ring 27c - coil #2.) Two thieves run past Artie on the first floor of the store and knock him into a perfume display. Police Wagon Willie can't catch them and offers to take Artie home so he can clean up. [Listener instructed to play segment #10.]

SEGMENT #3.3 (Side 1, Orange ring 27c - coil #3.) Artie is on the first floor of the store near the cosmetics counter when there is a green light special. During the ladies' mad rush to the counter a bottle of perfume is spilled on Artie. Police Wagon Willie has just gone off duty and offers to take Artie home so he can clean up. [Listener instructed to play segment #10].

Figure 4A:
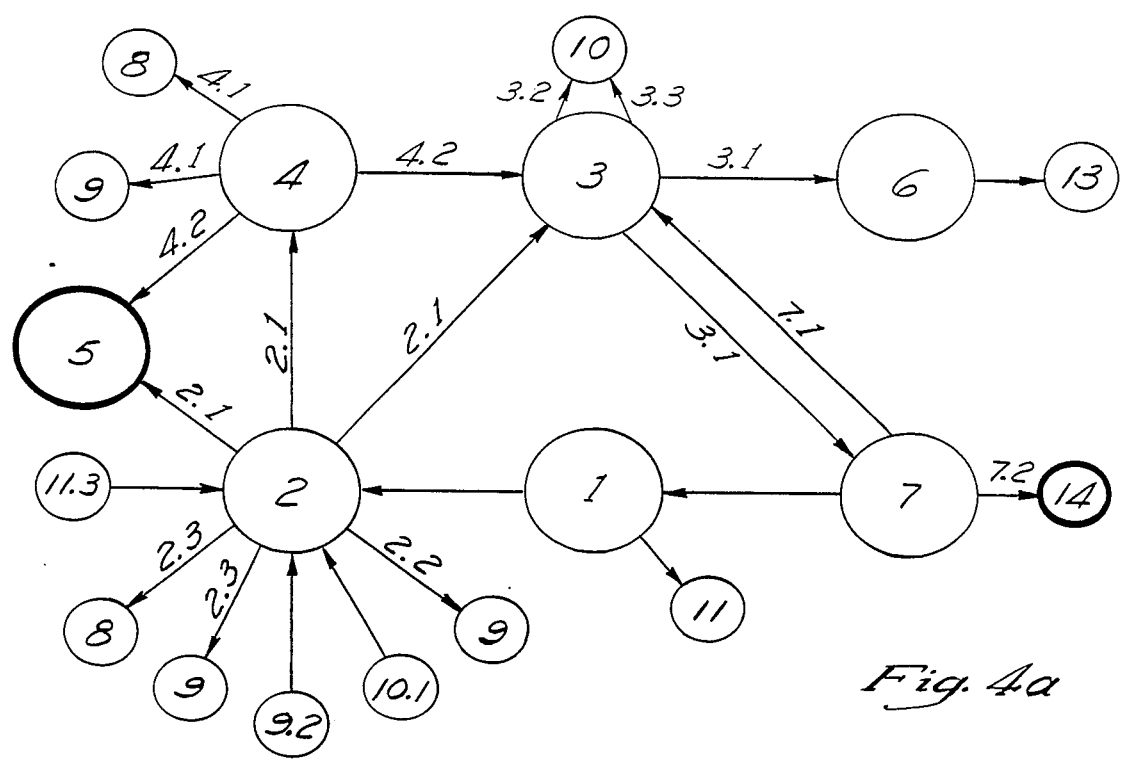
FIGS. 4a and 4b are a chart of the possible story paths for a second version of a story recorded on the recording of the invention.
Figure 4B:
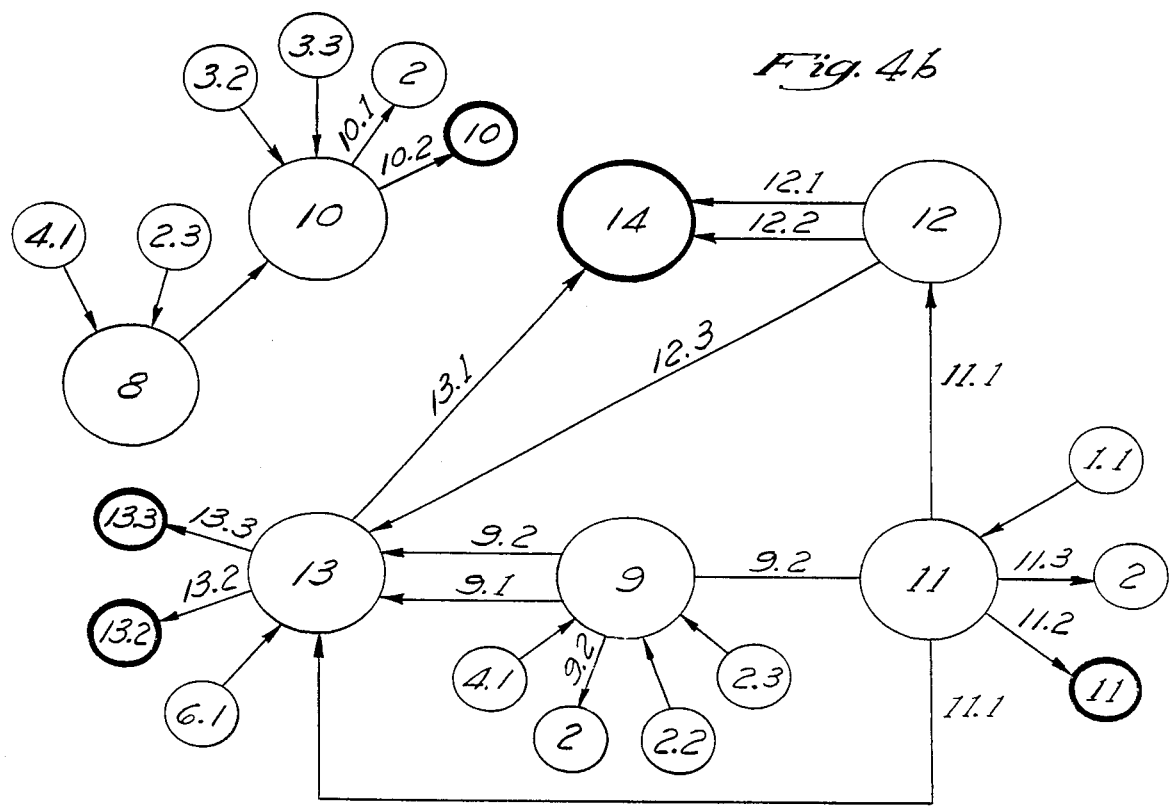

The inventor has devised a complete synopsis for the story of "Artie's Birthday Adventure" incorporating 14 bands, four of which have two parallel spirals or coils, and five of which have three coils. The remaining segments or bands have no coils, having only a single groove. FIGS. 4a and 4b show a map of the story segments as devised by the inventor for that synopsis. This map uses essentially the same identifying information as the map shown in FIGS. 3a and 3b.

The arrowed lines in the map of FIGS. 4a and 4b contain numbers, such as 2.1, 2.2, 2.3, etc., designating the individual coils on which the path is available. For example, band #2 (circle #2 in FIG. 4a) has three coils, identified as segments #2.1, #2.2, and #2.3. When the user selects segment #2, the stylus may enter any of these three coils. If segents #2.1 is selected, the available options given lead to band #3, band #4, or band #5. Thus, three arrows leading from circle #2 are identified #2.1, one each leading to circles #3, #4, and #5. Segment #2.3 (band #2, coil #3) permits a choice of either band #8 or band #9. Thus, two arrows leading from circle #2 are identified #2.3. Segment #2.2 pemits no choice, and leads only to band #9.

Continuing to refer to circle #2, representing band #2, the graph illustrates that this band may be reached from any of four segments. Band #2 may be selected from segment #1, segment #9.2, segment #10.1, or segment #11.3. Using this cart or map, one can follow the available story paths.

For the story devised and represented in the map of FIGS. 4a and 4b, the inventor has identified over 1,000 possible complete story lines, having different combinations of story segments. Based on experiments conducted by the inventor, it is estimated that to play all segments of the recording and experience all the choices according to the directions, the phonograph record would need to be played at least 12 times, with a minimum playing time of over 120 minutes. Thus, the user/listener receives the benefit of receiving the equivalent of a three-record set having 120 minutes of recorded material from a single phonograph record.

The availability of random options in certain tracks or bands is quite valuable for recorded instructional material. For example, in management instruction, the listener could be presented with a scenario, and asked to make a choice as to how he or she would respond, selecting different bands depending upon the answer. The randomization feature permitted by the multiple coils in the selected bands would allow for different responses to be given each representing a reaction representing a different type of employee to the situation set up by the user/listener.

The inventor has found that the embodiment in which a random selection is made among two or more tracks within a band is not suitable for the very youngest of children. It has been found that preschool children tend to have a strong association between the band and the material recorded thereon. If a second time they play the band a different audio presentation is made than was made the first time, the children may react negatively to it, However, for the older children, this randomization option can be very valuable for providing added interest to the story.

An embodiment of the recording including parallel spiral grooves in at least one band may be used in other situations in which an element of randomness is desired in segments of a recording. In such an embodiment, the recording may be such that visual identification of the bands is not necessary.

Variations to the Audio Recording

Another alternative for providing an element of randomness to the recorded segments is to cut the record with several parallel spirals running all the way from the outer edge of the record through to the center, without a lock groove at the end of any of the bands 27. Each groove is modulated, or has recorded information, in each band 27. These bands may again be identified by visual indicia, such as color. Between the bands, each of the parallel grooves is unmodulated. The unmodulated and modulated portions of the parallel grooves must align with each other as perfectly as possible, so that bands of parallel modulated grooves alternate with bands of unmodulated grooves (blank space), each having a clearly defined beginning and end.

The information recorded in each groove of a band may instruct the listener to select another band, perhaps including a choice of different bands. When the listener selects a band, one of the several parallel spirals will be selected essentially at random, and a story or instructional variation will be provided if different segments are recorded in the different parallel spirals. If a particular band is to have only one recorded segment option, the same recorded material is included on all the parallel spirals through that band.

Phonograph

The recording of the invention can be played on conventional, available, inexpensive playback equipment. For example, the phonograph record of the preferred embodiment can be played on a standard phonograph having a rotating turntable or platter and a hand-operable tone arm carrying the stylus. With the bands 27 visually identifiable by the user, the user can move the tone arm until the stylus is aligned with the dead or blank space 29 just preceding the band selected, then lower the tone arm to place the stylus on the record surface. Thus, no special equipment such as the expensive multi-track video or audio tape playback machines or the complicated and costly microcomputer controlled laser disk players for video and audio disks, is needed.

For certain applications, however, such as for extremely young children, it may be desirable to provide a phonograph that does not require manual manipulation of the tone arm. An example of such a phonograph 43 is shown in FIG. 5. That phonograph 43 may best be constructed for use with the phonograph record 21 embodying the invention if the records are manufactured all with corresponding bands 27 having the same width. Thus, if the color scheme shown in FIG. 2 is used, the beginning of the red band 27b is at the same position on each record manufactured in the series. Similarly, the beginning of the blue band 27f is at the same position on each record intended to be used with that phonograph 43. The phonograph shown in FIG. 5 has mechanical or electromechanical controls for moving the tone arm 45 from band to band without the user directly manipulating the tone arm. Such control mechanism would allow children to use the device without the risk of damage to the record.

The phonograph may include a lever 47 that can be placed in any of a series of slots 49, each slot 49 corresponding to one of the bands 27 of the phonograph record 21. Alternatively, buttons or other controls may be provided for selecting the band. Thus, when the instruction near the end of one band provides a choice of either, for example, the green band 27e or the yellow band 27d, the user may make his selection by either placing the lever 47 in the appropriate slot 49, or by pressing the proper button. The control mechanism lifts the tone arm of the phonograph and moves it to the appropriate place, setting it down so the stylus is at the beginning of the selected band or segment 27.

The slots or buttons 49 have indicia corresponding to the visual indicia on the bands of the record. In the embodiment shown in FIG. 5, which is intended to be used with the preferred phonograph record shown in FIGS. 1 and 2, the slots 49 are coded with colors corresponding to the colors of the bands. If other indicia are used on the record to identify the bands, corresponding indicia can identify the slots or buttons on the phonograph.

The phonograph having mechanical or electromechanical manipulation of the tone arm is simplest if all the bands have the same width. If all the bands are the same width, the controls can select the proper bands based on the standard increment.

Alternative Recording Media

The multiple segment, nonsequential recording described above as embodied in a phonograph record can also be embodied by the use of other recording media, such as audio cassette tapes, video tape cartridges, ROM chips, floppy disks or laser disks. Rather than color coded or other visually identified bands on a phonograph record, color coded cassettes of audio tape or of video tape are identified with visual indicia, with each cassette containing recorded information corresponding to one of the phonograph record bands. If only one option is to be provided for each selectable segment, so no randomization is present, one segment is recorded on each cassette. For audio casssettes, the same recording may be made on both sides of the cassette tape to eliminate the need to rewind the tape at the end of each play.

With audio cassettes, randomization can be provided by having a different recorded segment on each side of the cassette tape, so that which segment is played depends upon which side of the cassette is cued up ready to be played. If more than two options are desired, more than one segment may be recorded in one or more sides of the tape. Protective plastic leader tape may be included between recorded segments so the magnetic tape is not exposed to possible damage when the cassette is removed from the playback machine at the end of a segment.

With video tape cartridges, randomization can be provided by including two or more segments on the same tape cartridge, so that one time the segment is played, the first segment is replayed, but the next time that particular cartridge is played, the second segment is played, and so forth, until the end of the tape is reached, and rewinding is necessary. To protect the tape when the cartridge is removed from the playback apparatus and it is between segments on the tape, a clear plastic leader may be included between the tape sections.

Play Mat

Game boards have been used for thousands of years, providing the "battlefield" terrain for the contest. Recently, action figures have been provided with a terrain made of printed cardboard or toy cars and are accompanied with city streets printed on a sheet of plastic. These are two-dimensional play fields. Elaborate military sets for war games provide three-dimensional terrains.

In addition, approximately 100 years ago "theater toys" were popular. These theater toys were provided with a specific cast of characters for each play, and a script. Today, many toys are supplemented with a comic book or phonograph record with sound effects or script to enhance the fantasy play value of the play field or toy board.

But, these additional information systems with the toy tend to be passive, rather than interactive. A puppet show sound track, or the sound track provided with an action figure set has the limitation of becoming too familiar after a few listens, thus lessening its entertainment value for a child.

The multiple segment nonsequential recording described above provides an opportunity to provide sophisticated audio programming for the user, but still retaining the user's use of creativity and the user's involvement, as is especially desirable in children's play.

Essentially any two or three-dimensional object(s) can be designed as the actor(s) or tracker(s) to follow a particular information path of the interactive programming of the recording. As the user moves the objects in accordance with a particular interactive program a smooth, continuously changing, staging history develops. The staging history is, in large part, a function of the decisions made by the user in the past and in most cases will significantly influence the decision making process during subsequent interaction. The ongoing decision making process, resulting in continuous staging transitions may be conveniently referred to as dynamic morphology. The terrain for the actor(s) may be a two-dimensional area 61 or a three-dimensional play space 63. This combination of the user programmable recorded information and a two or three-dimensional scenario area can be used not only for children's toys, but also for a variety of educational and game applications. For toy applications, the inventor has designed a play field to coordinate with an interactive presentation. This combination provides a great deal of interaction for the child, greatly increasing the play value of the set over a simple sequential script.

The action scenes are programmed into the multiple segment nonsequential recording. The information on the recording provides a scenario upon which the two- or three-dimensional characters are moved on the play field 61, 63. The two-dimensional field 61 or three-dimensional play area 63 contains representations of roads, buildings, clues to mysteries, and other feedback and interactive features. Thus, the user carries out the action of the story from the recording on the play area and receives information and feedback from the trackers or play area. For example, the play field 61 shown in FIG. 6 is one play area that may be suitable to be used with a recording of "Artie's Birthday Adventure."

The play area may be either two-dimensional, as shown in FIG. 6, or three-dimensional, as shown in FIG. 7. The two-dimensional play area 61 shown in FIG. 6 includes four squares 65, 67, 69, 71 of a rigid material, such as cardboard. These squares are flexibly joined where they meet 73, 75, 77 except for one place 79, to facilitate folding and storage. The three-dimensional area shown in FIG. 7 is formed of four squares 81, 83, 85, 87 of a rigid material, such as cardboard, joined together to form a large square, with two of the squares 81, 87 not joined together where they meet.

The four squares 81, 83, 85, 87 of the three-dimensional play area are joined to one another so that one square 83 forms the base of the three-dimensional play area and the three other squares 81, 85, 87 form the backdrop. In the embodiment shown in FIG. 7, the base square 83 is joined to a first backdrop square 81 along one edge 91, and to a second backdrop square 85 along another, adjacent edge 93. The second backdrop square 85 is also joined to a third backdrop square 87 along the side 95 adjacent the side joined to the base square.

The joints 91, 93, 95 between the panels 81, 83, 85, 87 are preferably flexible, so the play area can be modified. Specifically, the joint 95 between the second and third backdrop squares 85, 87 is flexible so that the third background square 87 can be folded back away from the base square 83. The joint 91 between the base 83 and the first backdrop square 81 is also flexible so that the first backdrop square 81 can be raised to a vertical position. The first and third backdrop squares 81, 87 form interchangeable backdrop scenes. The scenes on the first and third backdrop squares 81, 87 are different, so that by changing them, the background for the play area can be changed. However, they both coordinate with the second backdrop scene square 85.

Other arrangements for a three-dimensional play area are also possible. For example, the first background square 81 may be joined to the base square 83 along the edge opposite the edge to which the second backdrop 85 is attached, to fold up and form a third vertical wall for the play area. Alternatively, three vertical backdrop walls 81, 85, 87 can be provided by joining the first backdrop square 81 to the third backdrop square 87 along the edge of the third background square opposite the edge to which it is joined to the second backdrop square 85, and the first background square 81 is not joined to the base square 83. Other possible arrangements will be apparent upon inspection.

Either the two dimensional play area 61 shown in FIG. 6 or the three-dimensional play area 63 shown in FIG. 7 may be formed in such a way as to fold up to become a package or jacket for the phonograph record 21. To perform that function, each small square of the play area is approximately 12 inches square, approximately the diameter of the phonograph record. The small squares are flexibly joined as described above. Adjacent squares are all flexibly connected to each other along the lines at which they meet, except for where the first and fourth squares meet.

To form the record jacket of the two-dimensional board 61 of FIG. 6, the fourth square 71 is folded over onto the third square 69. The record 21 is placed on top of the second square 67, and the first square 65 is folded over on top of it, as shown by the arrow in FIG. 8, to yield the arrangement shown in FIG. 9. The third and fourth panels 69, 71 then are folded over as shown in FIGS. 8 and 9 atop the first and second panels 65, 67 and the record 21, to form the completed package.

The three-dimensional play area shown in FIG. 7 may similarly fold up to form a jacket for the record. Referring to FIG. 7, the third background square 87 is folded over onto the second 85. The record 21 is placed on the base 83, and the first background square 81 is folded over it. Then, the second and third background squares 85, 87 can be folded onto the base 83, first background square 81, and record 21, to form the completed package.

Pop-up three dimensional effects may also be included on the play field, either in the two-dimensional configuration shown in FIG. 6 or in the three-dimensional configuration shown in FIG. 7.

The multiple segment, nonsequential format of the recording yields dozens of different stories on one phonograph record or other recording medium, as described above. Using the same recording and play area, the child can act out dozens of different stories, giving hours of play time.

One of the important benefits the inventor has identified that can result from the manipulation of three-dimensional characters through a multiple-choice story is the value of "role playing" games. Particularly, moral behaviorists have found that in tests, participants respond with a high level of moral reasoning when given a moral dilemma in writing. Yet, they demonstrate lower quality moral behavior when faced with a true life situation. A story presented on the multiple segment, nonsequential recording of the invention allows choices to be provided for the child at the end of many of the segments. The child then has the opportunity to choose different responses to a situation, and vicariously experience with the toy characters the consequences of his choice by actually performing the actions that result from the decision made. That experience of moving the toy character through the consequences of a moral decision reinforces and enhances the implementation of high moral thinking with physical execution.

A number of variations are possible using a combination of an interactive play field and a multiple segment user programmable recording. One is that the play field may be a sculptured board with "walking tracks" for use by wind-up or other powered toys. Thus, on cue, the child listener can push the start button of the particular wind-up character, and have it "walk" to its next destination in the story.

For particularly young children a useful variation is to provide color coded mini-dolls for use on the play field and coordinate those dolls with the recorded script to correspond to the color band being played. For example, the story can be written so that when the pink band of the recording is played, the pink character is involved in the story line, and can be moved according to the directions. At the end of the band, the child will be given the option to select one of several colors offered, and the corresponding character can be moved. The applications for this variation for preschool children seem particularly interesting.

Figure 11:
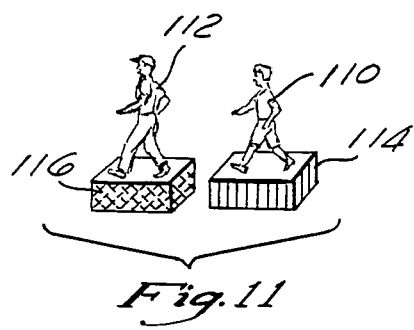
FIG. 11 shows two exemplary toys or trackers, having color coded bases, which may be moved in accordance with the program replayed from the recording of the invention.

FIG. 11 shows an alternative implementation of the color coded character concept. In particular FIG. 11 shows two three dimensional FIGS. 110, 112 each of which is mounted on a square block 114, 116. It can be seen from the drawing that there is a male FIG. 112 and a female FIG. 110. These FIGS. 110, 112 are advantageously of a size which is easily movable as a marker or tracker while listening to an interactive recording. Instead of coloring the entire figure with one color as suggested above, each of the bases 114, 116 of the figures are color coded to correspond to one or more color coded recorded segments. In this case the color of the male figure base 116 is orange while the color of the female figure base 114 is pink.

Figure 10:
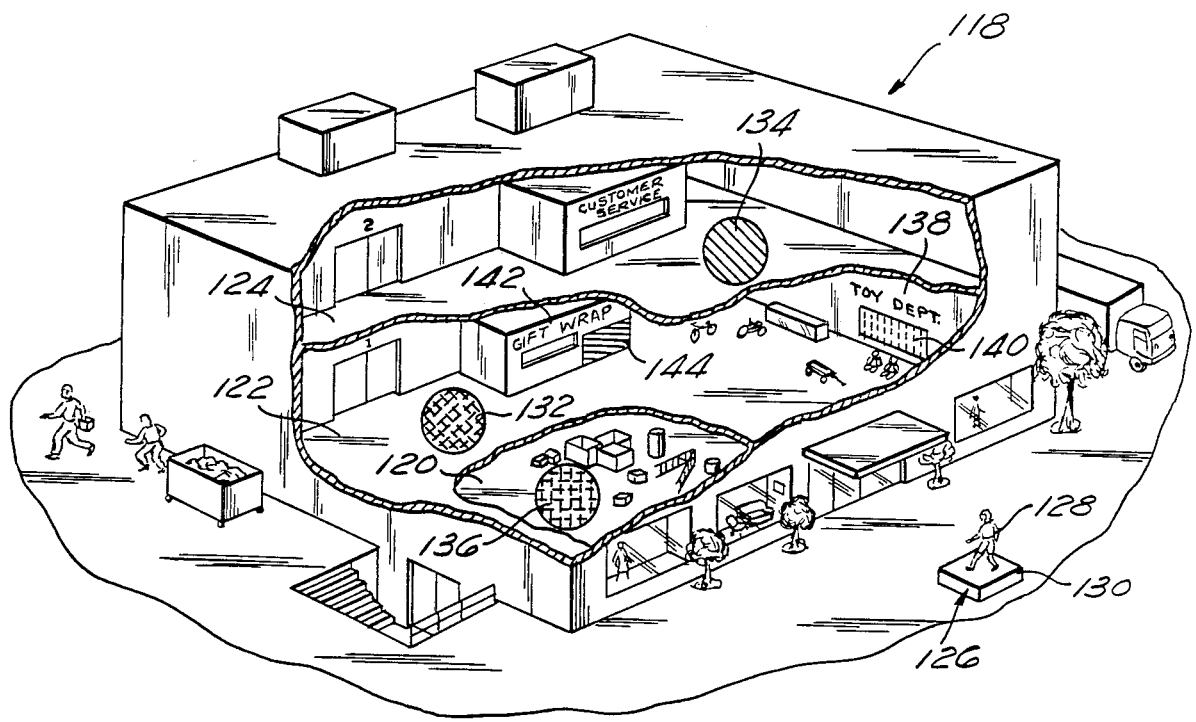
FIG. 10 shows an alternative preferred embodiment of an interactive play field with some locations being color coded.

In another variation shown in FIG. 10, certain locations on the play mat may be color coded to assist the user in remembering which options are available for selection at the end of a given segment. Thus for example in Segment #2 of the 14 segment "Artie's Birthday Adventure" synopsis discussed in detail previously, Artie arrives at the store and is presented with three alternative options at the end of the recorded segment. The first is to check with the toy department on the first floor of the store, the second is to check with customer service on the second floor and third is to check the basement. If the user decides that Artie should go to the first floor the user will play the orange band on side one of the record. If the user decides to go to the second floor the user will play the green band and if the user decides to go to the basement the yellow band will be played. In order to reinforce the choices available to the user the locations on the play mat are advantageously identified by colors corresponding to the color of the bands to be chosen.

FIG. 10 provides an example of how this might be implemented. FIG. 10 depicts a department store 118 having a basement level 120, a first floor level 122 and a second floor level 124. The floor levels 120, 122, 124 are depicted in the figure by showing a cut away section of the store 118. A play mat could incorporate this concept by incorporating a two dimensional drawing, like that shown in FIG. 10 directly on a two dimensional play mat. A piece 126 comprising a FIG. 128 mounted on a square base 130 may be moved from the basement to the first floor and to the second floor by simply moving over the two dimensional drawing.

This concept could also be implemented in three dimensions. Thus, a store having cut away sections like that shown in FIG. 10 could be constructed in three dimensions. A user would then be able to move the piece 126 from floor to floor in three dimensions.

Referring again to segment #2 of "Artie's Birthday Adventure," it can be seen that the three recorded segments to choose from are orange (first floor), green (second floor) or yellow (basement). As shown in the example of FIG. 10, these choices are reinforced by providing orange, green and yellow dots 132, 134, 136 respectively on the first, second and basement levels 122, 124, 120 of the store. Further it can be seen that if Artie selects the first floor 122 (orange dot 132) the recorded segment on the orange band will ask Artie to select between walking around the toy department 138 (purple band) or asking about his present at the gift wrap department 142 (blue band). These options are reinforced by providing a purple rectangle 140 next to the toy department 138 and a blue rectangle 144 next to the gift wrap department 142.

The color coding of locations on a play mat corresponding to colored bands or other indicia identifying a prerecorded segment may advantageously be used for a portion of the entire interactive recording or for an entire recording specially designed with this feature in mind.

What is claimed is:

1. A user interactive story-telling system comprising:
a plurality of stored recorded story segments;
at least some of said segments including an initial storyline portion followed by a multiple choice selection portion directing the user to select one of a specified plurality of recorded storyline segments, each of said selections corresponding to a different line of story development;
an object bearing visual information related to and coordinating with the storyline material recorded on at least one of said recorded segments, said object including visual information representing a character in the story, and sized for easy manual manipulation by the user to provide interactive feedback to the user while the user listens to the recorded segments;
and a play field related to and coordinated with the storyline material recorded on said recorded story segments said play field depicting various locations referred to in at least some of said story segments.

2. A user interactive system comprising:
a plurality of stored recorded segments, at least some of said segments including an initial program portion followed by a multiple choice selection portion directing the user to select one of a specified plurality of recorded segments;
an object bearing visual information related to and coordinating with the material recorded on at least one of said recorded segments, said object relating to a character and at least one of said recorded segments including a program which refers to said character, said object being sized for easy manual manipulation by the user to provide interactive feedback to the user while the user listens to the recorded segments, said object being a three-dimensional representation of said character; and
at least some of said plurality of stored recorded segments being identified and distinguished from one another by visual indicia, said object bearing a visual indicium corresponding to the visual indicium identifying said at least one stored recorded segment referring to said character represented by said object.

3. The user interactive system of claim 2 wherein the three dimensional representation of the character is mounted on a base which carries the visual indicium.

4. The user interactive system of claim 2 or 3 wherein the visual indicia are a plurality of colors.

5. The user interactive system of claim 4 wherein the recorded segments are stored on a phonograph record disk, said at least some of said recorded segments are recorded in concentric annular bands on said record disk, said bands are colored with a plurality of colors so that the bands can be readily identified and distinguished.

6. The user interactive system of claim 2 further comprising a plurality of three dimensional objects representing characters, each object bearing a visual indicium corresponding to the visual indicium identifying a stored recorded segment which refers to the character represented by the object.

7. A user interactive system comprising:
a plurality of recorded segments;
at least some of said segments including an initial program portion followed by a multiple choice selection portion directing the user to select one of a specified plurality of recorded segments;
an object bearing visual information relating to and coordinating with the material recorded on at least one of said recorded segments, said object sized for easy manual manipulation by the user to provide interactive feedback to the user while the user listens to the recorded segments; and
at least some of said plurality of stored recorded segments being identified by visual indicia, said object bearing a visual indicium corresponding to the visual indicium identifying said at least one of said stored recorded segments.

8. The user interactive system of claim 7 wherein the visual indicia are a plurality of colors.

9. The user interactive system of claim 8 wherein the recorded segments are stored on a phonograph record disk, said at least some of said recorded segments are recorded in concentric annular bands on said record, said bands being colored with a plurality of colors so that the bands can be readily identified and distinguished.

10. A user interactive system comprising:
a plurality of stored recorded segments;
at least one of said plurality of stored recorded segments including an initial program portion followed by a multiple choice selection portion directing the user to select one of a specified plurality of recorded segments;
said specified plurality of recorded segments referred to in said multiple choice selection portion are identified and distinguished from one another by visual indicia; and apparatus providing spaced locations, at least some of said locations bearing visual information related to and coordinating with the material recorded on said specified plurality of recorded segments to provided feedback to the user as the user listens to the recorded segments, at least some of said locations are identified and distinguished by visual indicia corresponding respectively to the visual indicia identifying the related recorded segments.

11. The user interactive system of claim 10 wherein said location providing apparatus in a play mat with representations of objects at various locations thereon corresponding to the material recorded on the segments.

12. The user iteractive system of claim 11 wherein said play mat includes at least one three dimensional structure representing one of said objects.

13. The user interactive system of claim 10, 11 o 12 wherein the visual indicia that identify and distinguish the stored recorded segments and the locations are a plurality of colors.

14. The user interactive system of claim 13 wherein the recorded segments are stored on a phonograph record disk, said specified plurality of recorded segments are recorded in concentric annular bands on said record, said bands being colored with a plurality of colors so that the bands can be readily identified and distinguished.

15. Apparatus comprising:
a phonograph record disk having a recorded program stored thereon, said program including a plurality of portions, each of said portions relating to the activities of one of a plurality of characters,
a plurality of manually manipulable objects corresponding to said plurality of characters, each object bearing visual information such that each object represents one of said plurality of characters;
said recorded program portions are identified and distinguished by visual indicia, and
each object bears a visual indicium corresponding to the visual indicium identifying the program portion relating to the character represented by the object.

16. The apparatus of claim 15 wherein each object is formed in the three dimensional shape of the character the object represents.

17. The apparatus of claim 15 or 16 wherein the visual indicia are a plurality of colors.

18. The apparatus of claim 17 wherein each of the portions are located in separate concentric bands on the record disk and the bands are colored with a plurality of colors so that they may be readily identified and distinguished.

19. A user interactive system comprising:
a plurality of cassette tapes, each tape having a recorded segment thereon;
said plurality of cassette tapes are identified and distinguished from one another by a plurality different visual indicia;
at least one of said segments on said cassettes including an initial program portion followed by a multiple choice selection portion directing the user to select one of a specified pluraltiy of segments, at least some of which segments are recorded on other cassettes.

20. The user interactive system of claim 19 wherein the cassette tapes are colored with a plurality of different colors so that they may be readily identified and distinguished.

21. The user interactive system of claim 19 wherein the cassette tapes are audio cassette tapes.

22. The user interactive system of claim 19 wherein the cassette tapes are video cassette tapes.

23. A method comprising:
providing a plurality of stored recorded segments which are divided into a plurality of sets of segments, at least some of said recorded segment sets having more than one recorded segment and at least some of said recorded segments including an initial program portion followed by a multiple choice selection portion directing the user to select one of a specified plurality of recorded segment sets all of said recorded segments having program portions which relate to the same subject matter such that a cohesive unit is formed;
providing an object bearing visual information relating to and coordinating with the material recorded on at least one of the segments of said specified plurality of recorded segment sets, said object sized for easy manual manipulation by the user;
providing a field for use with said objects, said field bearing visual information relating to and coordinating with the material recorded on at least one of said specified plurality of segments;
replaying one segment from a first segment set, said segment including an initial program portion followed by a multiple choice selection portion;
selecting one of the alternative segment sets specified in said multiple choice selection portion by manual actuation;
randomly selecting, in response to the previous selecting step, one of the recorded segments of the selected segment set;
replaying, in response to the random selection step, the randomly selected segment;
manually manipulating the object corresponding to the material on the segment being replayed over the field in accordance with the program.

24. A method, as defined in claim 23, wherein at least some of said recorded segments are identifiably distinguished from one another by visual indicia.

25. A method, as defined in claim 24, wherein said object bears visual indicia corresponding to the visual indicium identifying at least one of said plurality of recorded segment sets which refers to said object.

26. A method, as defined in claim 25, wherein said field bears visual indicia corresponding to the visual indicium of at least one of said plurality of recorded segment sets and said object.

27. A user interactive system comprising:
a phonograph record disk having a plurality of user selectable recorded segments on one side thereof, said recorded segments forming concentric annular bands on said record disk, the location on the record disk of each of said selectable recorded segments is identified by a visual indicium, at least some of said recorded segments having an initial program portion ending in a multiple choice selection portion, wherein said multiple selection portion instructs the user to select another segment from a plurality of specified segments;
a plurality of objects each object bearing a visual indicium corresponding to the visual indicium identifying one of said bands on said record, each object also bears visual information representing a character, said character corresponding to a character referred to in the program portion of a recorded segment bearing the same visual indicium as the object, said object sized for easy manual manipulation by the user to provide interactive feedback to the user while the user listens to the recorded segments.

28. A method comprising the steps of:

providing a plurality of stored recorded segments, at least some of said segments including an initial program portion which sets up an interactive storyline, followed by a multiple choice selection portion directing the user to select one of a specified plurality of recorded segments, said selections corresponding to different lines of story development;

providing an object bearing visual information relating to and coordinating with the storyline material recorded on at least one of said specified plurality of recorded segments, said object including a representation of a character in the story;

providing a play field having visual information corresponding to various locations referred to in the storyline material;

replaying one segment from said plurality of stored recorded segments, said segment including an initial program portion which sets up the interactive storyline, followed by a multiple choice selection portion corresponding to different branches of the story;

selecting one of the alternative segments specified in said multiple choice selection portion by manual actuation;

replaying, in response to the selection step, the selected segment; and manually manipulating the object corresponding to the character depicted in the storyline material on the segment being replayed, to a location on the play field corresponding to the location described in the storyline material on the segment being replayed.

* * * * *

UNITED STATES PATENT AND TRADEMARK OFFICE
CERTIFICATE OF CORRECTION

PATENT NO. : 4,753,597

DATED : June 28, 1988

INVENTOR(S) : Pash et al.

It is certified that error appears in the above-identified patent and that said Letters Patent is hereby corrected as shown below:

```
Column 2, line 65, change "inention" to --invention--.
Column 5, line 8, change "words" to --works--.
Column 6, line 11, change "thee" to --the--.
Column 9, line 50, change "29" to --39--.
Column 11, line  9, change "pemits" to --permits--.
Column 19, line 17, change "iteractive" to --interactive--.
Column 19, line 64, change "pluraltiy" to --plurality--.
```

Signed and Sealed this

Third Day of January, 1989

Attest:

DONALD J. QUIGG

*Attesting Officer*     *Commissioner of Patents and Trademarks*